(12) United States Patent
Matsunaga et al.

(10) Patent No.: US 6,454,180 B2
(45) Date of Patent: Sep. 24, 2002

(54) VEHICLE AIR CONDITIONER WITH HEATING CAPACITY CONTROL OF COOLING WATER CIRCUIT

(75) Inventors: Ken Matsunaga, Kariya; Masaya Tanaka, Anjo; Hisashi Ieda, Nagoya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/797,257

(22) Filed: Mar. 1, 2001

(30) Foreign Application Priority Data

Mar. 2, 2000 (JP) ......................................... 2000-056974
Oct. 19, 2000 (JP) ......................................... 2000-319313

(51) Int. Cl.⁷ ............................................... B60H 1/02
(52) U.S. Cl. ....................................... 237/12.3 B; 165/41
(58) Field of Search ..................... 237/12.3 B, 12.3 R, 237/2 A, 8 A; 165/41, 42

(56) References Cited

U.S. PATENT DOCUMENTS

| | | | |
|---|---|---|---|
| 4,883,082 A | * 11/1989 | Pirkle | ................... 137/315.01 |
| 5,255,733 A | * 10/1993 | King | ................... 123/142.5 R |
| 5,291,960 A | * 3/1994 | Brandenburg et al. | ... 123/41.14 |
| 5,816,495 A | * 10/1998 | Ito | ................... 122/26 |
| 5,906,177 A | * 5/1999 | Okabe et al. | ................... 122/26 |
| 5,947,376 A | * 9/1999 | Moroi et al. | ................... 122/26 |
| 6,039,007 A | * 3/2000 | Ban et al. | ................... 122/26 |
| 6,047,770 A | * 4/2000 | Suzuki et al. | ................... 165/202 |
| 6,059,198 A | * 5/2000 | Moroi et al. | ................... 122/26 |

FOREIGN PATENT DOCUMENTS

| | | |
|---|---|---|
| JP | A-6-320937 | 11/1994 |
| JP | A-11-208250 | 8/1999 |

* cited by examiner

Primary Examiner—Harold Joyce
Assistant Examiner—Derek S. Boles
(74) Attorney, Agent, or Firm—Harness, Dickey & Pierce, PLC

(57) ABSTRACT

In a vehicle air conditioner where air blown into a passenger compartment is heated in a heater core using cooling water for cooling a fuel cell system as a heating source, a flow amount of cooling water flowing into the heat core is controlled by a control valve based on a surplus heat quantity of the fuel cell system and a necessary heat quantity of the passenger compartment. Further, when the surplus heat quantity of the fuel cell system is smaller than the necessary heat quantity, an insufficient heat quantity is supplemented by a supplementary heater.

17 Claims, 12 Drawing Sheets

US 6,454,180 B2

VEHICLE AIR CONDITIONER WITH HEATING CAPACITY CONTROL OF COOLING WATER CIRCUIT

CROSS-REFERENCE TO RELATED APPLICATION

This application is related to Japanese Patent Applications No. 2000-56974 filed on Mar. 2, 2000, and No. 2000-319313 filed on Oct. 19, 2000, the contents of which are hereby incorporated by reference.

BACKGROUND OF THE INVENTION

1. Field of the Invention

The present invention relates to a vehicle air conditioner with a heating capacity control in a cooling water circuit having a heating heat exchanger for heating air. In the cooling water circuit, cooling water heated by an equipment that needs a temperature control circulates in the heating heat exchanger.

2. Description of Related Art

In a vehicle air conditioner, heating of a passenger compartment is performed using cooling water from an equipment that needs a temperature control, such as a water-cooled engine, as a heating source. When the heating of the passenger compartment is performed using cooling water of the water-cooled engine, a sufficient heating effect cannot be obtained when temperature of cooling water is low.

To overcome this problem, in a vehicle air conditioner described in JP-A-11-208250, an electrical heater is disposed in a cooling water circuit, and cooling water heated only by the electrical heater is supplied to a heater core in a closed water circuit without using heat from the engine until the temperature of cooling water in the engine becomes sufficiently high. On the other hand, when the temperature of cooling water in the engine is sufficiently high so that a sufficient heating effect can be obtained using cooling water from the engine, cooling water from the engine is supplied to the heater core, and the electrical heater is turned off. However, in this vehicle air conditioner, even when the temperature of cooling water in the engine increases and surplus heat is generated from the engine, when the temperature of cooling water in the engine is not increased to a temperature for obtaining the sufficient heating effect in the heater core, the heating of the passenger compartment is performed using the heat from the electrical heater in the closed water circuit. Accordingly, in this case, unnecessary heat discharged from the engine is not effectively used.

SUMMARY OF THE INVENTION

In view of the foregoing problems, it is an object of the present invention to provide a vehicle air conditioner which heats air using cooling water for a temperature control of an equipment as a heating source, in which a predetermined stable heating capacity of a passenger compartment can be obtained effectively using a surplus heat discharged from the equipment even when temperature of cooling water in the equipment is not sufficiently increased and a sufficient heating capacity is not obtained only using the heat of cooling water from the equipment.

According to the present invention, in an air conditioner for a vehicle having an equipment that needs a temperature control, a heating heat exchanger for heating air to be blown into a passenger compartment using cooling water as a heating source is disposed in a cooling water circuit, a supplementary heater for heating air is used for supplementing a heat quantity relative to the heating heat exchanger, a necessary heat quantity necessary for a heating of air blown into the passenger compartment is calculated based on a target air temperature, and a flow control unit controls a flow of cooling water in the cooling water circuit in such a manner that: cooling water from the equipment flows into the heating heat exchanger after temperature of the equipment increases to a predetermined temperature, and the flow of cooling water from the equipment to the heating heat exchanger is interrupted until the temperature of the equipment increases to the predetermined temperature. In the vehicle air conditioner, a heat quantity generated by the supplementary heater is used for supplementing an insufficient heat quantity when the heat quantity for heating air in the heating heat exchanger is smaller than the necessary heat quantity, after the temperature of the equipment increases to the predetermined temperature. Accordingly, when the temperature of the equipment increases the predetermined temperature, a surplus heat quantity unnecessary for the temperature control of the equipment is supplied to the heating heat exchanger. Therefore, even when the surplus heat quantity is a little, it can be effectively used for heating air. Further, when the surplus heat is insufficient for obtaining the necessary heat quantity in the heating heat exchanger, the insufficient heat quantity is supplemented by the supplementary heater. As a result, a predetermined heating capacity can be obtained.

On the other hand, until the temperature of the equipment increases to the predetermined temperature for a normal operation of the equipment, that is, when there is not the surplus heat discharged from the equipment, the flow of cooling water flowing into the heating heat exchanger is interrupted. Therefore, in this case, the temperature of the equipment can be rapidly increased, and it can prevent the temperature of the equipment from being lowered due to heat radiation from the heating heat exchanger. Even in this case, a heat-generating amount of the supplementary heater is controlled, so that the predetermined heating capacity can be obtained.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

Figure 1:
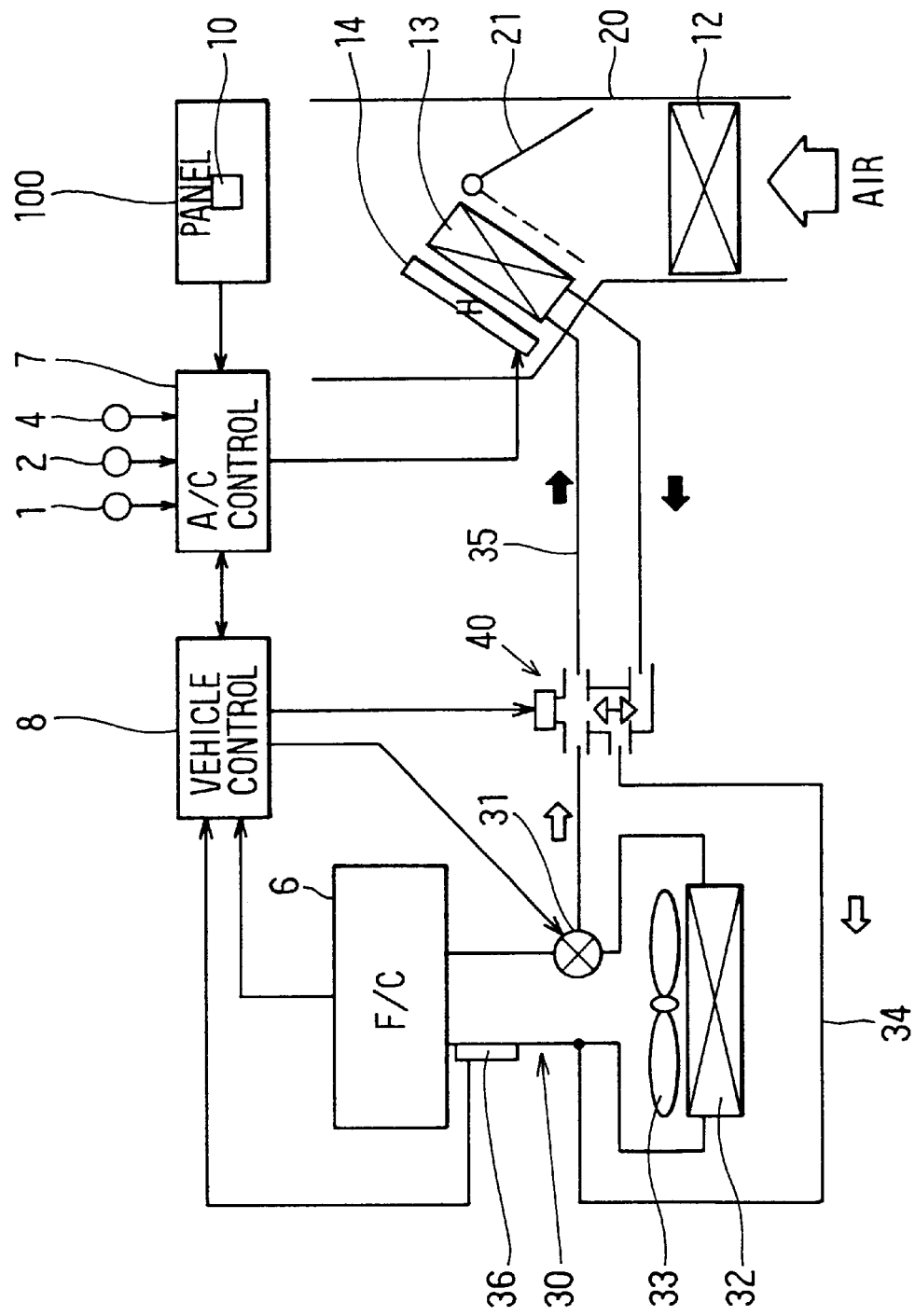
FIG. 1 is a schematic diagram showing a vehicle air conditioner with a cooling water circuit, according to a first preferred embodiment of the present invention.

A first preferred embodiment of the present invention will be now described with reference to FIGS. 1–4. In the first embodiment, the present invention is typically applied to an air conditioner for a fuel-cell powered vehicle. As shown in FIG. 1, a fuel cell system (F/C) 6 that is an equipment needed to perform a temperature control is connected to a cooling water circuit 30. The fuel cell system 6 has therein a water pump (not shown) so that cooling water for cooling the fuel cell system 6 is circulated in the cooling water circuit 30.

A radiator 32, for radiating a surplus heat of cooling water to an outside of a passenger compartment, is disposed in the cooling water circuit 30. The cooling water circuit 30 has a first cooling water passage 34 through which cooling water bypasses the radiator 32 when it is unnecessary to radiate heat of cooling water to the outside of the passenger compartment. A three-way valve 31 for distributing cooling water from the fuel cell system 6 is disposed at an upstream branch point of both a cooling water passage toward the radiator 32 and the first cooling water passage 34. An electrical fan 33 is disposed so that outside air outside the passenger compartment is blown toward the radiator 32. By adjusting an air amount passing through the radiator 32 from the electrical fan 33, a heat quantity radiated from the radiator 32 can be adjusted.

A control valve 40 is disposed in the first cooling water passage 34 at a downstream side of the three-way valve 31 in a water flow direction. The control valve 40 is a flow control unit for controlling a ratio between a flow amount of cooling water flowing into a heater core 13 and a flow amount of cooling water bypassing the heater core 13.

A temperature sensor 36 for detecting temperature of cooling water flowing into the fuel cell system 6 is disposed in the cooling water circuit 30 at an upstream side of the fuel cell system 6 in the water flow direction. An output signal from the temperature sensor 36 and an operation signal from the fuel cell system 6 and the like are input into a vehicle control unit 8. The vehicle control unit 8 performs a predetermined calculation based on the signals from the temperature sensor 36 and the fuel cell system 6, and outputs control signals for controlling operations of the three-way valve 31 and the control valve 40. The vehicle control unit 8 outputs information regarding the heat quantity of cooling water to an air conditioning control unit (hereinafter, referred to as "A/C control unit") 7.

On the other hand, an air duct 20 defining an air passage through which air flows into the passenger compartment is provided. An evaporator 12 for cooling air is disposed in the air duct 20 to fully close an entire air passage so that all air passing through the air passage flows through the evaporator 12, and a blower (not shown) is disposed at an upstream air side of the evaporator 12 in the air duct 20. The heater core 13 for heating air using cooling water as a heating source is disposed at a downstream air side of the evaporator 12 to close a part of the air passage, and an electrical heater (e.g., PCT heater) 14 used as a supplementary heater is disposed at a downstream air side of the heater core 13 in the air duct 20. Therefore, air passes through the heater core 13 and the electrical heater 14 after passing through the evaporator 12.

An air mixing damper 21 is disposed at an upstream air side of the heater core 13 to adjust an air amount ratio passing through the heater core 13 so that air blown into the passenger compartment is adjusted.

At a most downstream air side of the air duct 20, plural air outlets are provided so that conditioned air is blown into the passenger compartment through the plural air outlets. The plural air outlets include a defroster air outlet through which air is blown toward an inner surface of a front windshield, a face air outlet through which air is blown toward the upper side of a passenger in the passenger compartment, a foot air outlet through which air is blown toward the foot area of the passenger in the passenger compartment. The plural air outlets are opened and closed by an air outlet mode switching door so that each air amount blown from the plural air outlets is adjusted.

At an upstream air side of the blower, an inside air/outside air switching damper (not shown) for switching an introduction ratio between inside air and outside air is disposed.

Sensor signals from a sensor group are input into the A/C control unit 7. The sensor group includes an interior temperature sensor 1 for detecting temperature within the passenger compartment, an outside air temperature sensor 2 for detecting temperature of outside air outside the passenger compartment, and a sunlight sensor 4 for detecting a sunlight amount entering into the passenger compartment. Further, a temperature setting unit 10 for setting a target temperature within the passenger compartment is provided in an operation panel 100. A signal from the temperature setting unit 10 is also input into the A/C control unit 7.

The A/C control unit 7 calculates a necessary air conditioning capacity (e.g., target air temperature) based on the signals from the sensors 1, 2, 4 and the temperature setting unit 10 in accordance with a predetermined control program and a predetermined control map. The A/C control unit 7 outputs information regarding a necessary heat quantity necessary in the heater core 12 to the vehicle control unit 8.

Figure 2A:
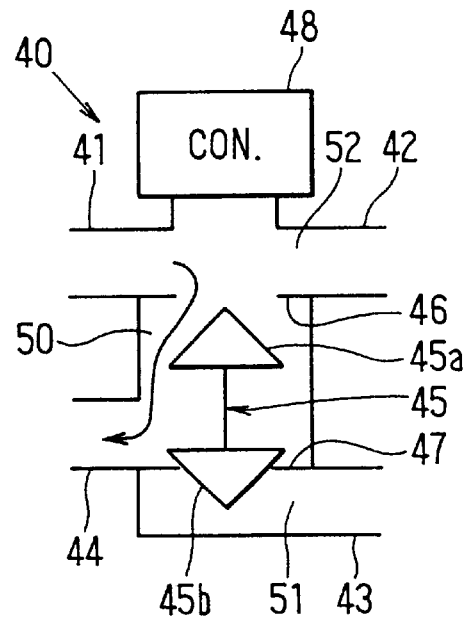
FIGS. 2A and 2B are enlarged views showing a control valve used in the cooling water circuit according to the first embodiment.
Figure 2B:
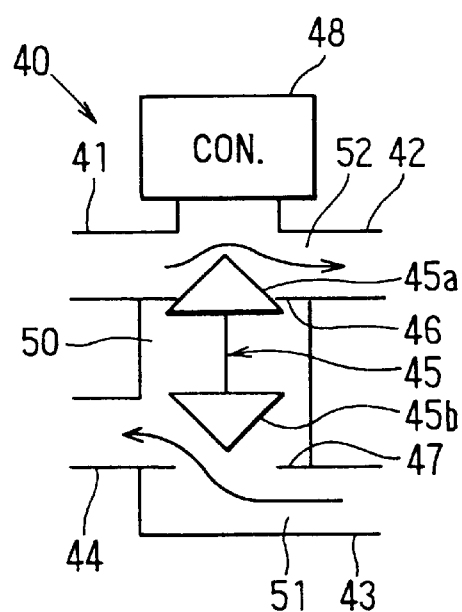

Next, a structure of the control valve 40 will be now described with reference to FIGS. 2A and 2B. As shown in FIGS. 2A and 2B, the control valve 40 has a first inlet 41 from which cooling water from the fuel cell system 6 flows into the control valve 40, a first outlet 42 through which cooling water flowing from the first inlet 41 flows out toward the heater core 13, a second inlet 43 from which cooling water from the heater core 13 flows into the control valve 40, and a second outlet 44 through which cooling water flows out toward the fuel cell system 6.

Within the control valve 40, a valve member 45 having a first valve body 45a and a second valve body 45b is disposed to be movable in an up-down direction in FIGS. 2A, 2B. Both the first and second valve bodies 45a, 45b are provided at both upper and lower end sides of the valve member 45. The control valve 40 also has therein a first seat 46 on which the first valve body 45a tightly contacts, and a second seat 47 on which the second valve body 45b tightly contacts. As shown in FIG. 2A, when the valve member 45 is positioned at the most bottom position in a movable range of the valve member 45, the first valve body 45a is separated from the first seat 46, and the second valve body 45b tightly contacts the second seat 47. on the other hand, as shown in FIG. 2B, when the valve member 45 is positioned at the most top position in the movable range of the valve member 45, the first valve body 45a tightly contacts the first seat 46, and the second valve body 45b is separated from the second seat 47.

The valve member 45 is disposed in the control valve 40 so that plural passages can be defined within the control valve 40. That is, the plural passages within the control valve 40 are a first passage 50 through which cooling water from the first inlet 41 flows out from the second outlet 44, a second passage 51 through which cooling water from the second inlet 43 flows out from the second outlet 44, and a third passage 52 through which cooling water from the first inlet 41 flows out from the first outlet 42. The first inlet 41 and the second outlet 44 are provided at a side of the fuel cell system 6, and the first outlet 42 and the second inlet 43 are provided at a side of the heater core 13. The first passage 50 is opened and closed by the first valve body 45a, the second passage 51 is opened and closed by the second valve body 45b, and the third passage 52 is always opened.

Figure 3A:
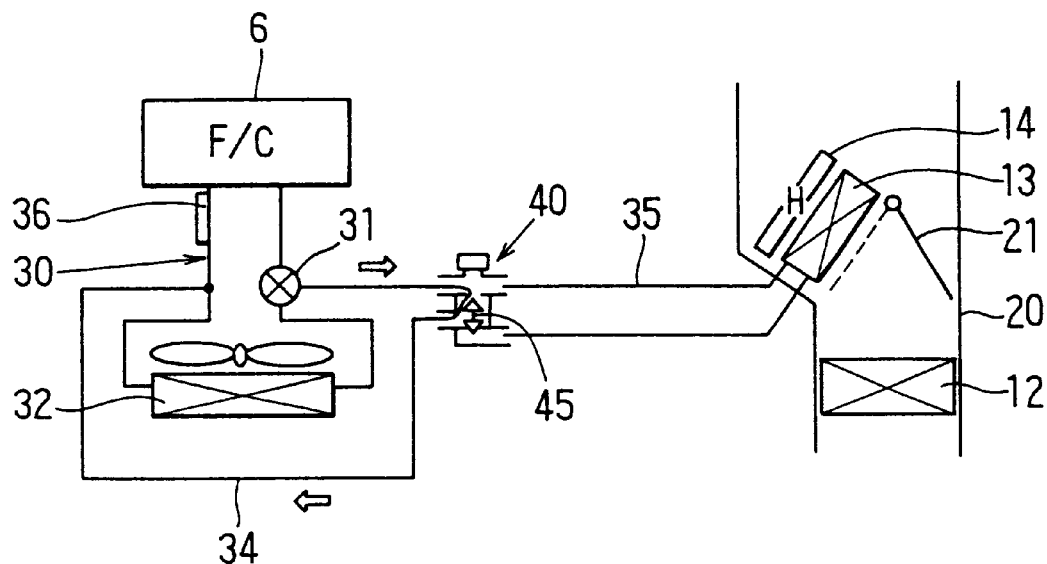
FIG. 3A is a schematic diagram showing a flow of cooling water bypassing a heater core in the cooling water circuit.
Figure 3B:
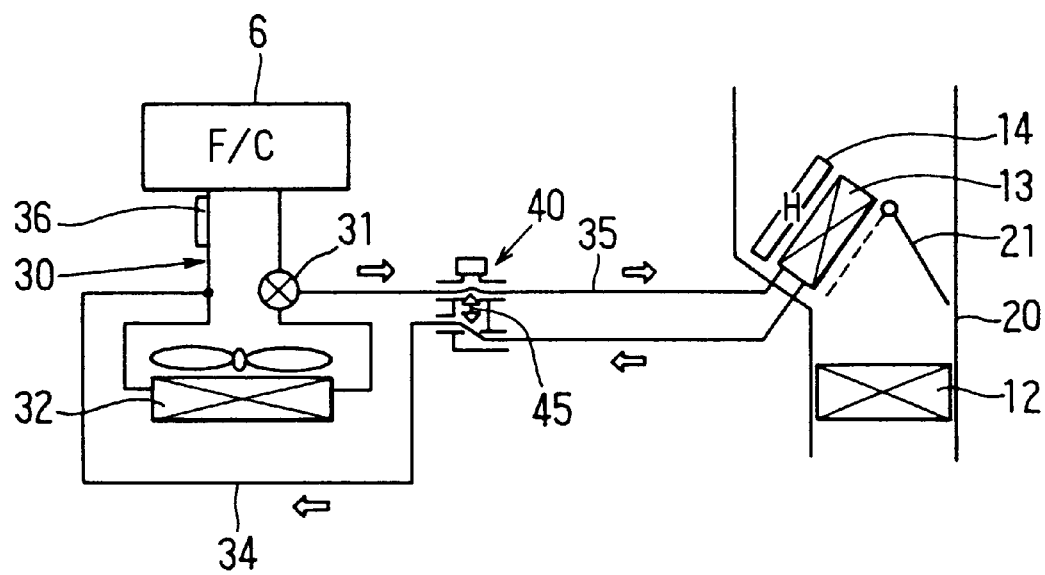
FIG. 3B is a schematic diagram showing a flow of cooling water flowing into the heater core in the cooling water circuit, according to the first embodiment.

When cooling water flowing into the first cooling water passage 34 through the three-way valve 31 flows toward the fuel cell system 6 while bypassing the heater core 13, the valve member 45 is placed at the most bottom position in the movable range of the valve member 45, as shown in FIG. 3A. On the other hand, when cooling water flowing into the first cooling water passage 34 through the three-way valve 31 flows into the heater core 13, the valve member 45 is placed at the most top position in the movable range of the valve member 45, as shown in FIG. 3B.

A controller 48 made of an electric solenoid is provided in the control valve 40, so that the valve member 45 is moved in the vertical direction (up-down direction) in FIGS. 2A, 2B by electric magnetic force. The control of the valve body due to the controller 48 can be performed by a duty ratio control. For example, in the first embodiment, the controller 48 controls a time period for which cooling water passes through the first passage 50 and a time period for which cooling water passes through the second passage 51, so that a ratio between a flow amount of cooling water bypassing the heater core 13 and a flow amount of cooling water passing through the heater core 13 is adjusted.

Figure 4:
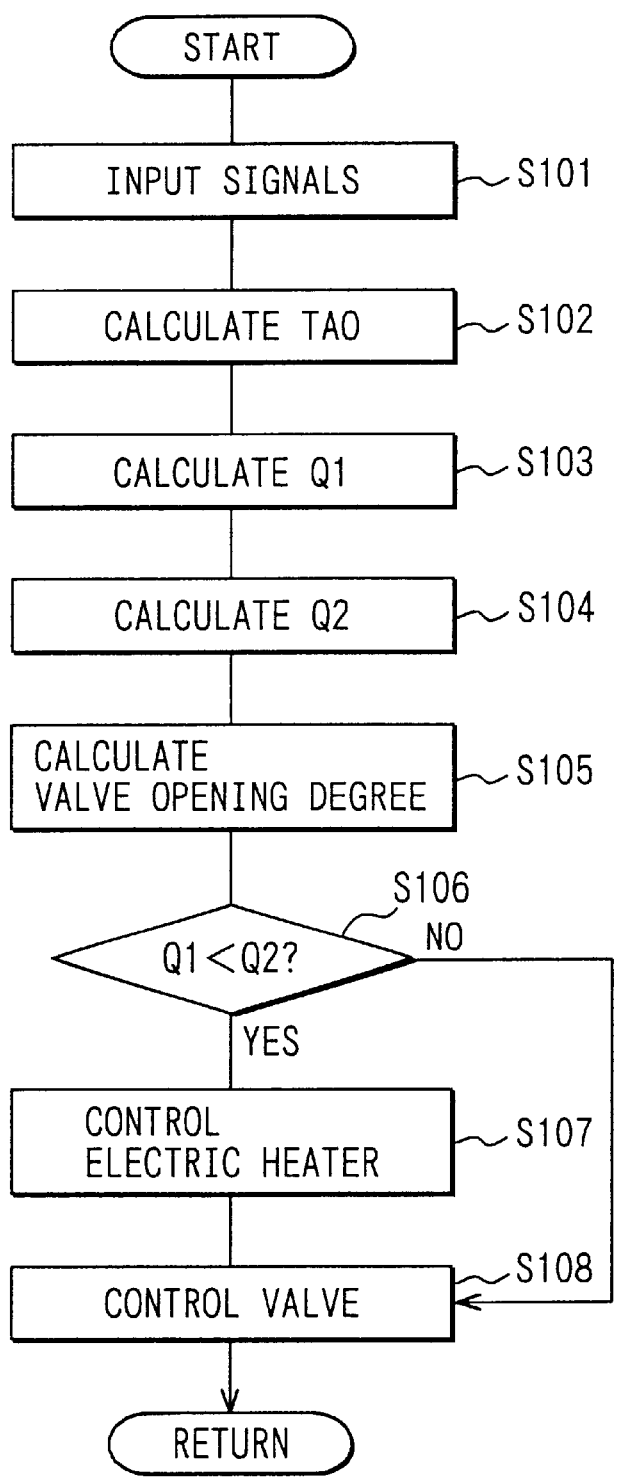
FIG. 4 is a flow diagram showing a heating capacity control of an A/C control unit and a vehicle control unit, according to the first embodiment.

FIG. 4 is a flow diagram showing a heating capacity control of the A/C control unit 7 and the vehicle control unit 8. As shown in FIG. 4, at step S101, various signals from the sensors 1, 2, 4 and the temperature setting unit 10 are input into the A/C control unit 7. Next, at step S102, a target air temperature TAO to be blown into the passenger compartment is calculated based on the input signals in accordance with the following formula (1).

$$TAO = KSET \times TSET - KR \times TR - KAM \times TAM - KS \times TS + C \quad (1)$$

wherein, TSET is a set temperature set by the temperature setting unit 10, TR is the temperature of the passenger compartment detected by the interior temperature sensor 1, TAM is the outside air temperature detected by the outside air temperature sensor 2, TS is the sunlight amount detected by the sunlight amount sensor 4. Further, KSET, KR, KAM and KS are coefficients, and C is a correction constant.

Next, at step S103, a heat quantity Q1 which is unnecessary heat for maintaining a stable operation state of the fuel cell system 6 is calculated. That is, at step S103, a surplus heat quantity radiated from the fuel cell system 6 is estimated from a state (e.g., electrical power generating state, effect) of the fuel cell system 6 and a detection value of the water temperature sensor 36. The stable operation state of the fuel cell system 6 means a temperature range (e.g., 76–80° C.), for example, in which a suitable electrical-power generating effect of the fuel cell system 6 can be maintained stably.

Next, at step S103, the A/C control unit 7 calculates necessary heat quantity Q2 necessary for performing an air conditioning operation, by using the target air temperature TAO calculated at step S102, and the necessary heat quantity Q2 is output to the vehicle control unit 8.

Next, at step S105, the vehicle control unit 8 determines an opening degree of the control valve 40 based on the heat quantity Q1 and the heat quantity Q2 so that a possible quantity in the heat quantity Q1 is supplied to the heater core 13 in a range of the heat quantity Q2. At this time, the vehicle control unit 8 outputs a control signal to the three-way valve 31 so that cooling water from the fuel cell system 6 flows toward the control valve 40 in the first cooling water passage 34.

Next, at step S106, it is determined whether or not the surplus heat quantity Q1 is smaller than the necessary heat quantity Q2. When the heat quantity Q1 is smaller than the heat quantity Q2, the vehicle control unit 8 sends the information of the heat quantity Q1 to the A/C control unit 7.

At step S107, the A/C control unit 7 controls electrical power of the electrical heater 14 so that insufficient heat quantity is supplemented by the electrical heater 14 to obtain the necessary heat quantity Q2. That is, the control at step S107 is heat quantity controlling means of the first embodiment.

Next, at step S108, the vehicle control unit 8 controls the control valve 40 in accordance with the necessary opening degree calculated at step S105. For example, when it is determined that the heat quantity Q1 is smaller than the heat quantity Q2, the valve member 45 of the control valve 40 is placed at the most top position in the movable range as shown in FIG. 3B so that all cooling water from the first inlet 41 flows into the heater core 13.

In the control of the electrical heater 14, electrical power supplied to the electrical heater 14 can be on/off controlled so that temperature of air blown from the electrical heater 14 becomes a predetermined temperature. Alternatively, electrical power supplied to the electrical heater 14 can be linearly controlled using an inverter or the like. Further, the electrical power supplied to the electrical heater 14 can be controlled so that temperature of air blown into the passenger compartment becomes the target air temperature TAO using the characteristics of the heater core 13 and the electrical heater 14.

When the surplus heat quantity Q1 is not smaller than the necessary heat quantity Q2 at step S106, the vehicle control unit 8 controls the control valve 40 in accordance with the necessary opening degree of the control valve 40 calculated at step S105. When the heat quantity Q1 is equal to the heat quantity Q2, the valve member 45 of the control valve 40 is placed at the most top position in the movable range as shown in FIG. 3B so that all cooling water from the first inlet 41 flows into the heater core 13.

When the surplus heat quantity Q1 is larger than the necessary heat quantity Q2, the position of the valve member 45 of the control valve 40 is suitably adjusted in the movable range. Further, when the heat quantity Q1 is larger than the heat quantity Q2, the non-radiated heat increases the temperature of the fuel cell system 6. Accordingly, when the detection value of the water temperature sensor 36 is at the upper limit value-of the temperature control range of the fuel cell system 6, the vehicle control unit 8 controls the three-way valve 31 so that cooling water from the fuel cell system 6 temporarily flows into the radiator 32 and surplus heat quantity in the cooling water cycle 30 is discharged to the outside of the passenger compartment. That is, when the surplus heat quantity Q1 is larger than the necessary heat quantity Q2, a part of the surplus heat quantity Q1, equal to the necessary heat quantity Q2, is supplied to the heater core 13 among the surplus heat quantity Q1, and the other part (Q1–Q2) of the surplus heat quantity Q1 is supplied to the radiator 32. In the first embodiment, when the heat quantity Q1 is not smaller than the heat quantity Q2, the electrical heater 14 is not turned on.

As described above, when a suitable heating capacity is not obtained only using heat of the cooling water from the fuel control system 6, such as when the temperature of cooling water flowing from the fuel cell system 6 is low in a long time or when the temperature of cooling water flowing from the fuel cell system 6 is frequently low, the electrical heater 14 can be used as the supplementary heating source. Accordingly, exhaust heat from the fuel cell system 6 can be effectively used in maximum, and a stable heating capacity can be obtained.

Further, the temperature of cooling water flowing into the fuel cell system 6 can be controlled to the suitable temperature control range using the heat radiation from the heater core 13 and the radiator 32. Accordingly, operation effect of the fuel cell system 6 can be maintained at a high level.

In the first embodiment, cooling water from the control valve 40 flows into the heater core 13 through a second cooling water passage 35, as shown in FIG. 1. The control valve 40 and the heater core 13 are connected in the cooling water circuit 30 through the second cooling water passage 35. Accordingly, a valve (not shown) for opening and closing the second cooling water passage 35 can be provided in the second cooling water passage 35. In this case, when the temperature of the fuel cell system 6 is not increased to the suitable temperature range for the suitable operation state of the fuel cell system 6, a closed water passage can be formed in the second cooling water passage 35 using the control valve 40 and the vale provided in the second cooling water passage 35. Accordingly, in this case, it can prevent heat from being radiated from the heater core 13, and the suitable operation state of the fuel cell system 6 can be obtained.

Figure 5:
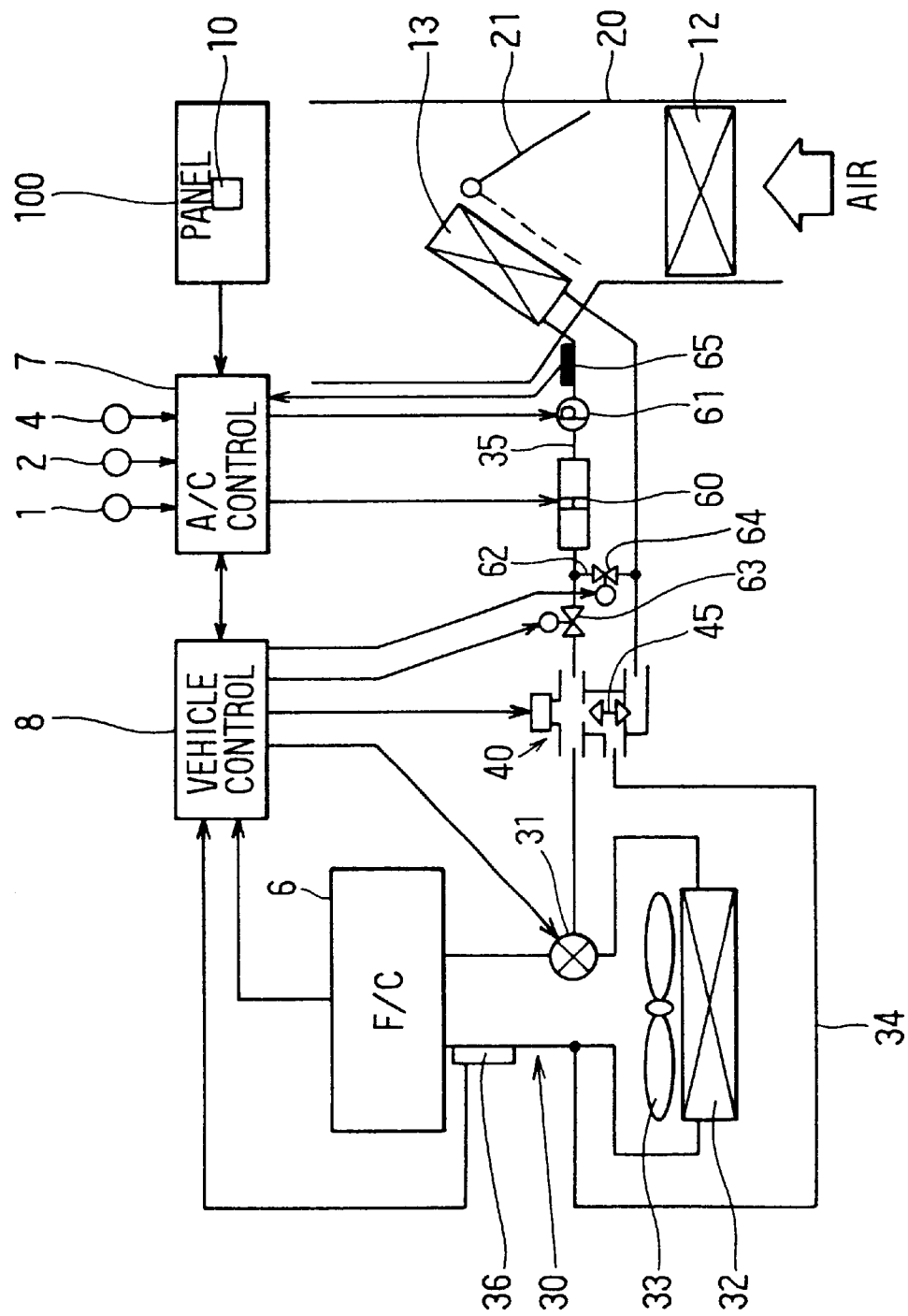
FIG. 5 is a schematic diagram showing a vehicle air conditioner with a cooling water circuit, according to a second preferred embodiment of the present invention.

A second preferred embodiment of the present invention will be now described with reference to FIG. 5. In the above-described first embodiment, an insufficient heat quantity which is not supplied by the heater core 13, among the necessary heat quantity for the air-conditioning operation of the passenger compartment, is supplied by the electrical heater 14 disposed at a downstream air side of the heater core 13 in the air duct 20. However, in the second embodiment, as shown in FIG. 5, an electrical heater 60 is disposed in the second cooling water passage 35 through which cooling water circulates to be supplied to the heater core 13. That is, cooling water to be supplied to the heater core 13 is heated using the electrical heater 60 so that the insufficient heat quantity is supplemented from the electrical heater 60.

In the second embodiment, components similar to those of the above-described first embodiment are indicated with the same reference numbers, and the explanation thereof is omitted. As shown in FIG. 5, an electrical valve 63 is disposed in the second cooling water passage 35 through which the control valve 40 and the heater core 13 communicate with each other, at a downstream side of the control valve 40 in the water flow direction. Further, the electrical heater 60 used as a supplementary heater for heating cooling water flowing through the second cooling water passage 35 is disposed in the second cooling water passage 35 at a downstream side of the electromagnet valve 63 in the water flow direction. A water pump 61 is disposed in the second cooling water passage 35 at a downstream side of the electrical heater 60, and a temperature sensor 65 for detecting temperature of cooling water flowing into the heater core 13 is disposed in the second cooling water passage 35 at a downstream side of the water pump 61, in the water flow direction.

A downstream side of the heater core 13 in the second cooling water passage 35 is connected to an upstream side of the heater core 13 in the second cooling water passage 35 at a position between the electromagnetic valve 63 and the electrical heater 60, by a passage 62, so that a closed water passage is formed. An electromagnetic valve 64 is disposed in the passage 62 to open and close the passage 62.

According to the second embodiment, when the heat quantity radiated from the fuel cell system 6 is smaller than the necessary heat quantity Q2 necessary for the air-conditioning operation, the A/C control unit 7 controls the electrical heater 60 so that the insufficient heat quantity is supplemented from the electrical heater 60. At this time, similarly to the above-described first embodiment, the vehicle control unit 8 controls the control valve 40, so that the valve member 45 of the control valve 40 is placed at the most top position in the movable range as shown in FIG. 3B, and all cooling water from the first inlet 41 flows into the heater core 13. In this case, the electromagnetic valve 63 is opened and the electromagnetic valve 64 is closed.

When the electrical-power generating effect (operation state) of the fuel cell system 6 is not in the suitable operation state and the heat quantity Q1 discharged from the fuel cell system 6 is zero, the vehicle control unit 8 controls the control valve 40 so that the valve member 45 is placed at the most bottom position in the movable range, the electromagnetic valve 63 is closed and the electromagnetic valve 64 is opened. In this case, all cooling water from the fuel cell system 6 returns to the fuel cell system 6 through the first passage 50 in the control valve 40 while bypassing the heater core 13. Accordingly, the second cooling water passage 35 formes a closed water circuit, and the closed water circuit does not communicate with the fuel cell system 6. Here, the water pump 61 in the second cooling water passage 35 is operated so that cooling water in the closed second cooling water passage 35 flows through the water pump 61, the heater core 13, the passage 62 and the electrical heater 60 in this order, so that the necessary heat quantity necessary for the heating operation of the passenger compartment can be supplied to the heater core 13. At this time, the A/C control unit 7 controls operation of the electrical heater 60 based on a signal from the temperature sensor 65.

Similarly to the above-described first embodiment, when the suitable heating capacity used for the air-conditioning operation of the passenger compartment is insufficient only using the heat of cooling water from the fuel cell system 6, such as when the temperature of cooling water flowing from the fuel cell system 6 is low in a long time or when the temperature of cooling water flowing from the fuel cell system 6 is frequently low, the electrical heater 60 can be used as the supplementary heating source. Accordingly, exhaust heat from the fuel cell system 6 can be effectively used in maximum, and a stable heating capacity can be obtained.

Further, when the surplus heat quantity discharged from the fuel cell system 6 is zero, the necessary heat quantity Q2 is supplied to the heater core 13 in the closed second cooling water passage 35. Accordingly, even when the surplus heat from the fuel cell system 6 is not generated, a stable heating capacity can be rapidly obtained.

A third preferred embodiment of the present invention will be now described with reference to FIG. 6. In the third embodiment, the structure of the control valve 40 described in the first embodiment is changed, and the other parts are similar to those of the above-described first embodiment. In the third embodiment, components similar to those of the above-described first embodiment are indicated with the same reference numbers, and the explanation thereof is omitted.

Figure 6:
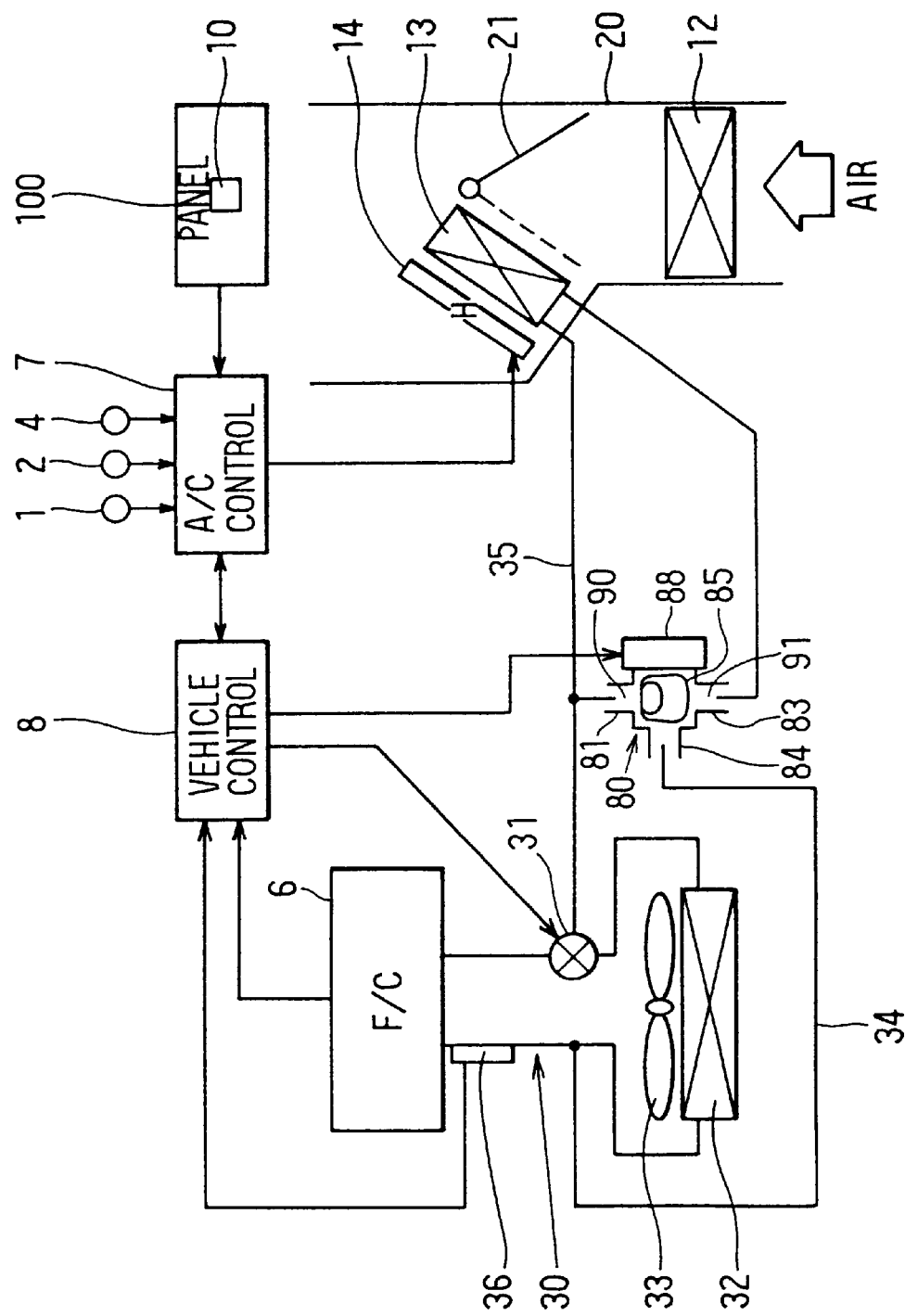
FIG. 6 is a schematic diagram showing a vehicle air conditioner with a cooling water circuit, according to a third preferred embodiment of the present invention.

In the third embodiment, as shown in FIG. 6, a control valve 80 is used instead of the above-described control valve 40. The control valve 80 has therein a first inlet 81 from which cooling water from the fuel cell system 6 flows into the control valve 80, a second inlet 83 from which cooling water from the heater core 13 flows into the control valve 80, and an outlet 84 from which cooling water in the control valve 80 flows toward the fuel cell system 6. A valve body 85 is rotatably disposed in the control valve 80, so that a first passage 90 from the first inlet 81 to the outlet 84, and a second passage 91 from the second inlet 83 to the outlet 84 are defined in the control valve 80.

The control valve 80 has a controller 88 made of a servomotor. The valve body 85 is controlled by the controller 88 to be rotated by a predetermined rotation angle. By adjusting a rotation angle of the valve body 85, an opening area ratio between the first passage 90 and the second passage 91 can be adjusted, so that a ratio between the flow amount of cooling water bypassing the heater core 13 and the flow amount of cooling water passing through the heater core 13 is adjusted.

Similarly to the above-described first embodiment, when the necessary heating capacity used for the air-conditioning operation of the passenger compartment is insufficient only using the heat of cooling water from the fuel cell system 6, such as when the temperature of cooling water flowing from the fuel cell system 6 is low in a long time or when the temperature of cooling water flowing from the fuel cell system 6 is frequently low, the electrical heater 14 can be used as the supplementary heating source. Accordingly, exhaust heat from the fuel cell system 6 can be effectively used in maximum, and a stable heating capacity can be obtained.

A fourth preferred embodiment of the present invention will be now described with reference to FIGS. 7–10. In the fourth embodiment, similarly to the above-described second embodiment, the electrical heater 60 for heating cooling water flowing into the heater core 13 is used as a supplementary heater. However, a cooling water passage structure is different from that of the above-described second embodiment. In the fourth embodiment, components similar to those of the above-described first and second embodiments are indicated with the same reference numbers, and the explanation thereof is omitted.

Figure 7:
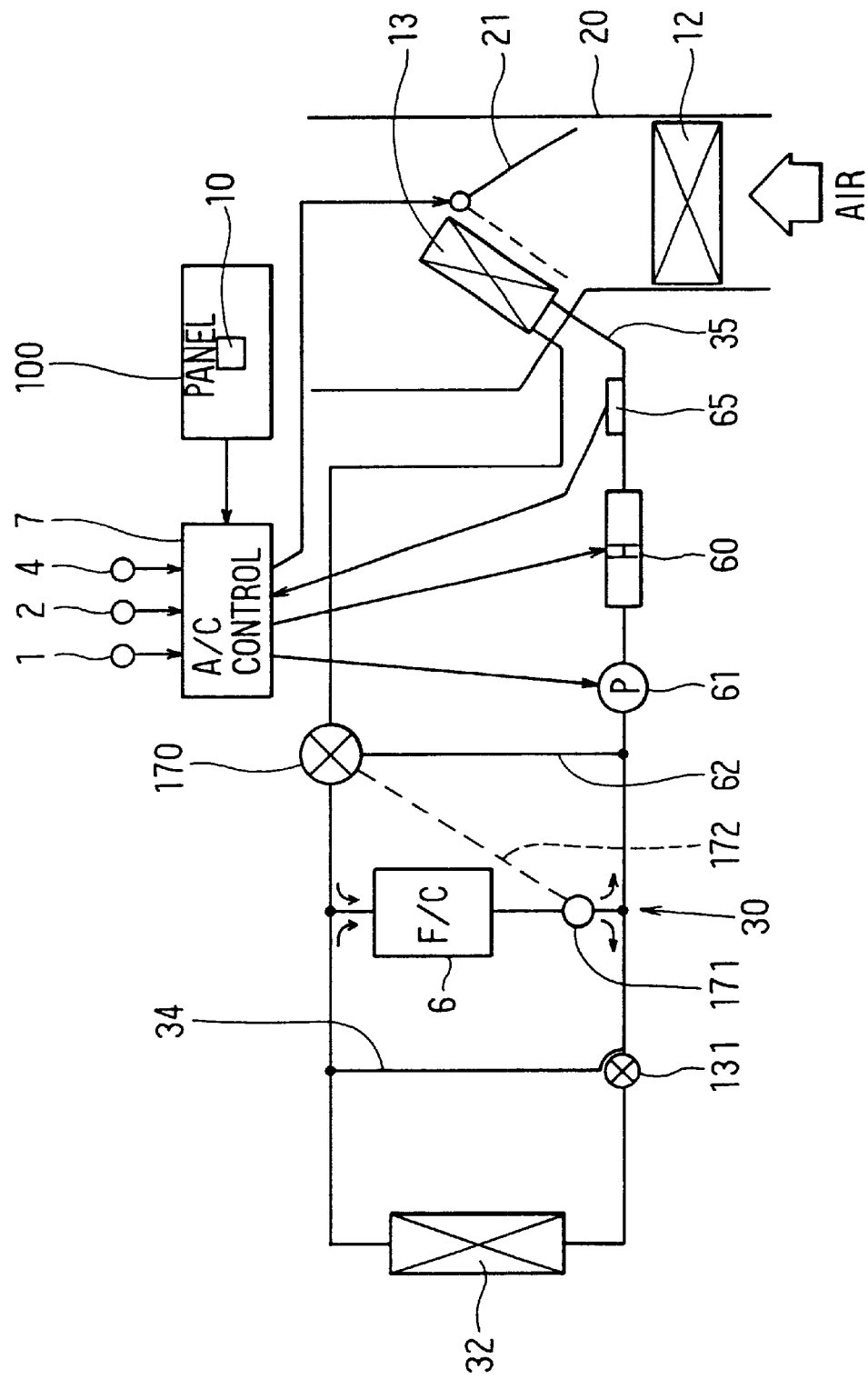
FIG. 7 is a schematic diagram showing a vehicle air conditioner with a cooling water circuit, according to a fourth preferred embodiment of the present invention.

In the fourth embodiment, the fuel cell system 6 is connected to the cooling water circuit 30 as shown in FIG. 7. The cooling water circuit 30 has a first cooling water passage 34 through which cooling water circulates at a left side circuit of the fuel cell system 6 in FIG. 7, and a second cooling water passage 35 through which cooling water circulates at a right side circuit of the fuel cell system 6 in FIG. 7, including the heater core 13. A water pump (not shown) is provided within the fuel cell system 6 so that cooling water circulates in the cooling water circuit 30. By cooling water circulating in the cooling water circuit 30, temperature of the fuel cell system 6 is controlled (cooled) in a suitable temperature range (e.g., 72–80° C.) where the electrical-power generating effect of the fuel cell system 6 can be made suitable. Generally, the fuel cell system 6 operates normally in the suitable temperature range (e.g., 72–80° C.).

The radiator 32 is disposed so that both upstream and downstream sides of the radiator 31 are connected to the first cooling water passage 34. A thermo-control valve 131 is disposed at an upstream connection point of the radiator 32 with the first cooling water passage 32 to be opened when temperature of cooling water flowing through the first cooling water passage 34 becomes equal to or higher than a predetermined temperature (e.g., 80° C.). Accordingly, when the temperature of cooling water flowing through the first cooling water passage 34 becomes equal to or higher than 80° C., heat of cooling water in the cooling water cycle 30 is discharged to the outside of the vehicle from the radiator 32 so that the suitable electrical-power generating effect of the fuel cell system 6 can be maintained.

Further, as shown in FIG. 7, between the fuel cell system 6 and the heater core 13 in the second cooling water passage 35, the water pump 61, the electrical heater 60 used as the supplementary heater, and the temperature sensor 65 detecting temperature flowing into the heater core 13 are disposed.

Similarly to the above-described second embodiment, a downstream side portion of the heater core 13 in the second cooling water passage 35 and an upstream side portion of the water pump 61 are connected by the passage 62 for forming a closed water circuit, and a three-way valve 170 is disposed at a connection point between the passage 62 and the downstream side position of the heater core 13 in the second cooling water passage 35. Therefore, a flow of cooling water from the heater core 13 to the fuel cell system 6 and a flow of cooling water from the heater core 13 to the passage 62 for forming the closed water circuit are switched by the three-way valve 170.

A thermo-work actuator 171, which is driven when the temperature of cooling water flowing from the fuel cell system 6 is equal to or higher than a predetermined temperature (e.g., 76° C.), is disposed at an upstream side (the side of the fuel cell system 6) of a branch point between the first cooling water passage 34 and the second cooling water passage 35. The thermo-work actuator 171 is a mechanical actuator in which a driving force is converted from a temperature change without using an electrical force.

The three-way valve 170 and the thermo-work actuator 171 are connected by a link mechanism 172 so that the three-way valve 170 is operated by the driving force of the thermo-work actuator 171. In the fourth embodiment, flow switching means is constructed by the three-way valve 170, the thermo-work actuator 171 and the link mechanism 172.

Figure 8:
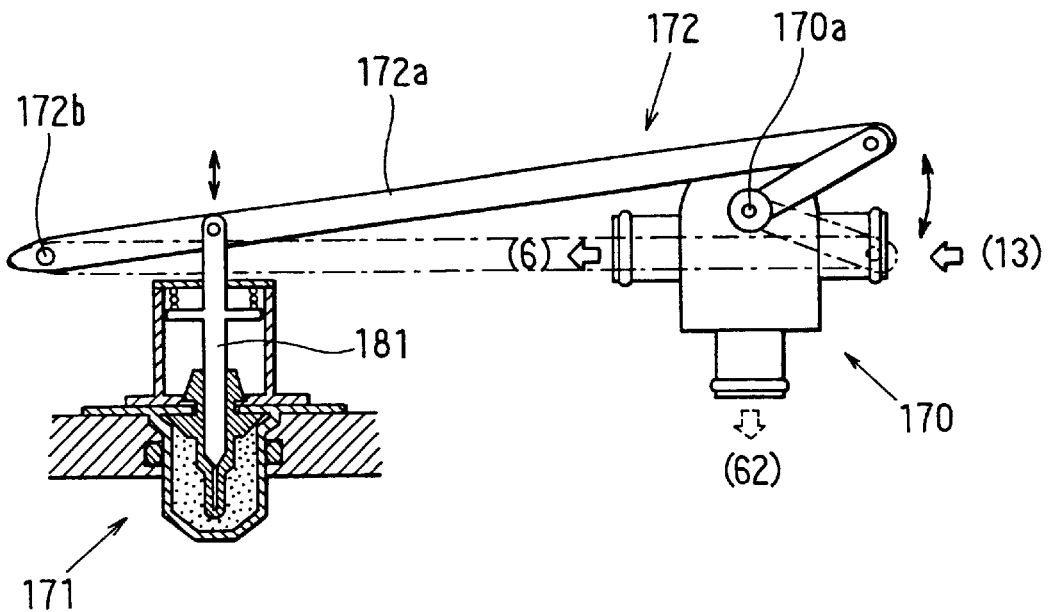
FIG. 8 is a view for explaining a valve operation mechanism according to the fourth embodiment.

Next, an operation mechanism of the flow switching means according to the fourth embodiment will be now described. As shown in FIG. 8, when a shaft 181 of the thermo-work actuator 171 is driven in the up-down direction in FIG. 8, the shaft 181 moves around a support point 172b of a transmission shaft 172a of the link mechanism 172. Accordingly, the link mechanism 172 rotates a rotation shaft 170a of the three-way valve 170 so that a valve body (not shown) disposed within the three-way valve 170 is operated.

Figure 9A:
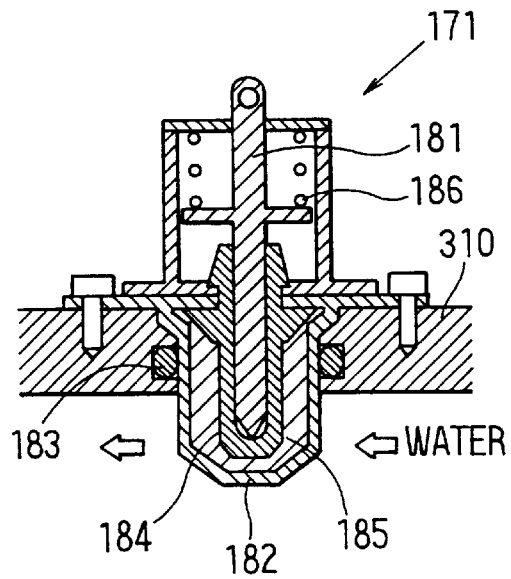
FIGS. 9A and 9B are views for explaining operation of a thermo-work actuator 171 according to the fourth embodiment.
Figure 9B:
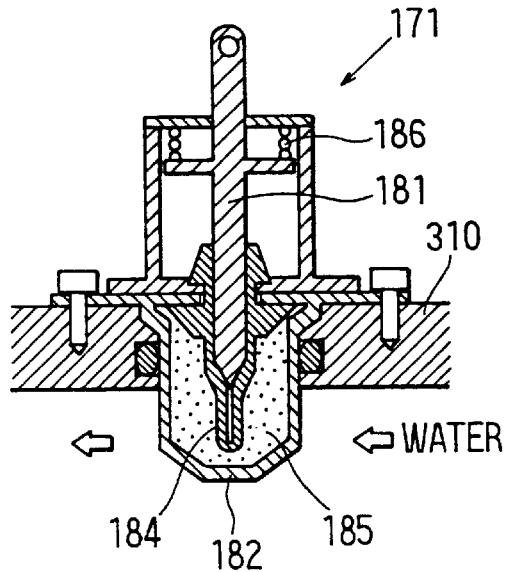

As shown in FIG. 9A, a thermal sensitive housing 182 of the thermo-work actuator 171 is inserted into a hole of a pipe block 310 defining a part of the cooling water circuit 30 to be screwed therein. An O-ring 183 is disposed between the thermal housing 182 and the pipe block 310. A seal member 184 made of a rubber member is formed into a cylindrical shape having a bottom surface. The shaft 181 is disposed in the seal member 184. A volume expansion wax 185, that becomes solid under temperature lower than 76° C. and becomes liquid under temperature equal to or higher than 76° C., is filled between the thermal sensitive housing 182 and the seal member 184. Accordingly, when the temperature of cooling water flowing in the pipe block 310 from the fuel cell system 6 is lower than 76° C., the shaft 181 is placed at the position in FIG. 9A. On the other hand, when the temperature of cooling water flowing in the pipe block 310 from the fuel cell system 6 is equal to or higher than 76° C., the wax 185 is melted and becomes liquid so that the volume of the wax 185 expands. Therefore, as shown in FIG. 9B, the wax 185 presses the outer peripheral surface of the seal member 184 to push the shaft 181 upwardly. Then, when temperature of cooling water flowing in the pipe block 310 from the fuel cell system 6 is lower than 76° C., the wax 185 solidifies and the volume thereof is reduced. At this time, by spring force of a spring 186 disposed around the shaft 181, the shaft 181 returns to the position shown in FIG. 9A.

Thus, the shaft 181 is driven in accordance with the temperature of cooling water flowing in the pipe block 310. That is, when the temperature of the cooling water is equal to or higher than 76° C., the transmission shaft 172a is moved at the solid line position in FIG. 8 so that cooling water from the heater core 13 flows toward the fuel cell system 6 through the three-way valve 170. On the other hand, when the temperature of the cooling water is lower than 76° C., the transmission shaft 172a is moved at the chain line position in FIG. 8 so that cooling water from the heater core 13 flows through the passage 62 through the three-way valve 170.

Accordingly, when the temperature of the cooling water is equal to or higher than 76° C., cooling water from the fuel cell system 6 flows into both the first cooling water passage 34 and the second cooling water passage 35. On the other hand, when the temperature of the cooling water is lower than 76° C., because cooling water circulates in a closed water circuit formed by the second cooling water passage 35 and the passage 62, cooling water does not circulates in the first cooling water passage 34.

Because the temperature range of 76–80° C. is the suitable temperature range in which the suitable electrical-power generating effect of the fuel cell system 6 can be stably maintained, the operation state of the fuel cell system 6 under the temperature range of 76–80°C. is the stable operation state of the fuel cell system 6.

Similarly to the above-described first and second embodiments, plural signals from the interior temperature sensor 1, the outside air temperature sensor 2, the sunlight sensor 4, the temperature sensor 65 and the temperature setting unit 10 are input into the A/C control unit 7.

The A/C control unit 7 calculates a necessary air-conditioning capacity based on the input signals from the sensors 1, 2, 4 and the temperature setting unit 10 in accordance with the a predetermined control program and a predetermined control map, and outputs control signals to each actuator. Further, the A/C control unit 7 controls the electrical heater 60 based on the signal from the temperature sensor 65 and the calculated necessary heating capacity, and controls the water pump 61 based on a signal from an A/C switch.

Figure 10:
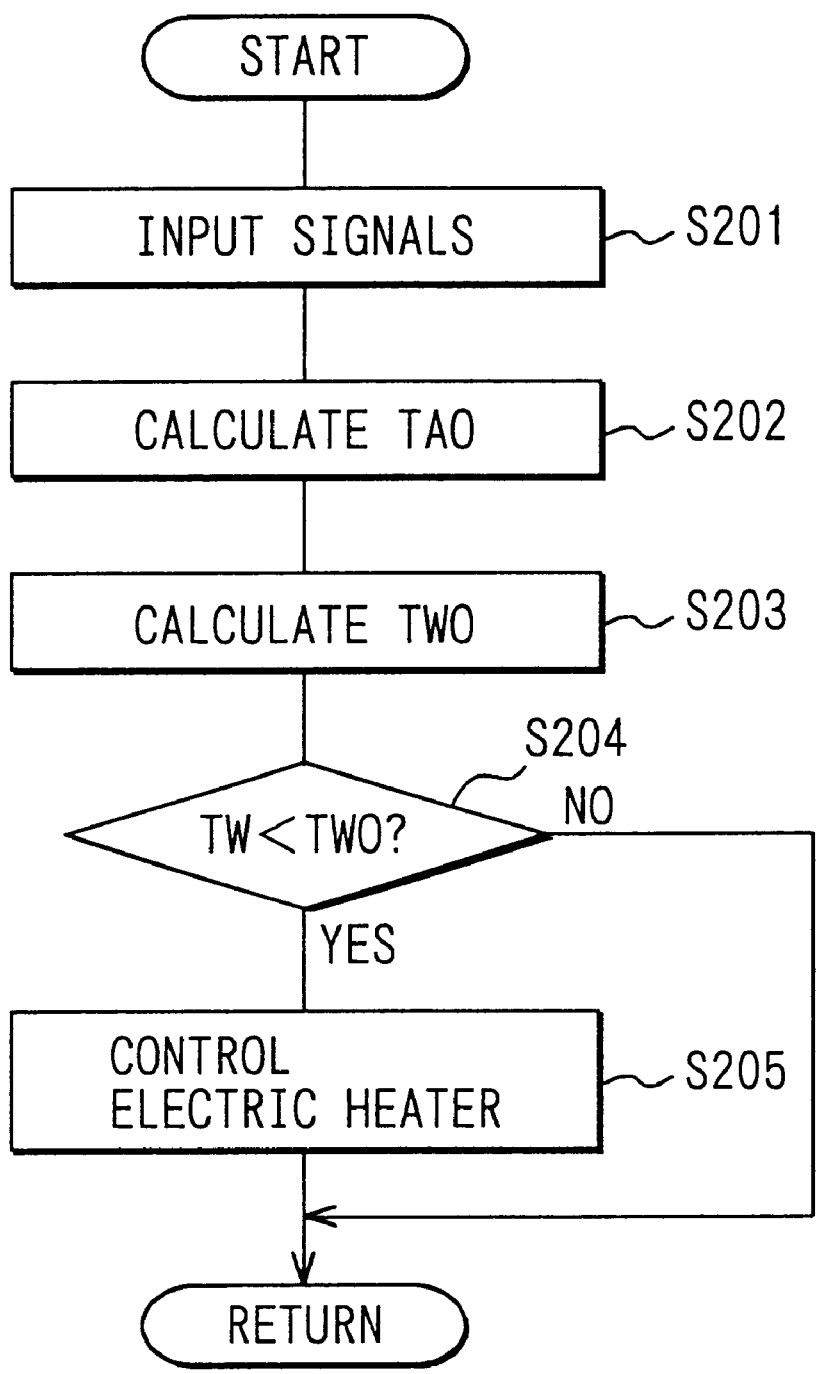
FIG. 10 is a flow diagram showing a heating capacity control of an A/C control unit according to the fourth embodiment.

Next, operation of the fourth embodiment will be now described with reference to FIGS. 7 and 10. As shown in FIG. 10, at step S201, various signals from the sensors 1, 2, 4 and temperature setting unit 10 are input into the A/C control unit 7. Next, at step S202, the target air temperature TAO to be blown into the passenger compartment is calculated based on the input signals in accordance with the above-described formula (1).

Next, at step S203, a target temperature TWO of cooling water flowing into the heater core 13, necessary for obtaining the target air temperature TAO, is calculated. That is, at step S203, the necessary heat quantity, necessary for heating air to be blown into the passenger compartment to the target air temperature TAO, is calculated. In the fourth embodiment, step S203 constructs heating amount calculation means.

Next, at step S204, it is determined whether or not the water temperature TW detected by the temperature sensor 65 is smaller than the calculated target temperature TWO of cooling water. When it is determined that the water temperature TW flowing into the heater core 13 is smaller than the target temperature TWO at step S204, the A/C control unit 7 controls electrical power to be supplied to the electrical heater 60 at step S205, so that the necessary air-conditioning heat quantity can be supplemented. Then, the control routine returns.

On the other hand, when the water temperature TW detected by the temperature sensor 65 is not smaller than the target temperature TWO at step S204, the control routine returns without performing the operation of step S205.

As shown in FIG. 10, in the fourth embodiment, when the temperature of cooling water from the fuel cell system 6 is lower than the target temperature needed to heat air by the heater core 13, the insufficient heat quantity is supplemented by the electrical heater 60 so that a stable heating capacity can be obtained in the passenger compartment. In the fourth embodiment, when the A/C switch is turned on, the A/C control unit 7 controls the water pump 61 to be operated.

When the necessary heating capacity is not obtained only using heat of the cooling water from the fuel cell system 6, such as when the temperature of cooling water flowing from the fuel cell system 6 is low in a long time or when the temperature of cooling water flowing from the fuel cell system 6 is frequently low, the electrical heater 60 can be used as the supplementary heating source. Accordingly, even when surplus heat quantity unnecessary in the fuel cell unit 6 is a little, exhaust heat from the fuel cell system 6 can be effectively used in maximum, and a predetermined stable heating capacity can be obtained.

When the heat quantity discharged from the fuel cell system 6 is zero, that is, when the surplus heat quantity is not generated from the fuel cell system 6, all the necessary heat quantity is supplied from the electrical heater 60 to the cooling water, and the cooling water heated in the electrical heater 60 circulates in the closed second cooling water circuit 35 including the heater core 13. Accordingly, even when the surplus heat from the fuel cell system 6 is not generated, the necessary heating capacity can be rapidly obtained using heat from the electrical heater 60.

Further, the temperature of cooling water flowing into the fuel cell system 6 can be controlled by radiating heat from the heater core 13 and the radiator 32. Therefore, the operation effect of the fuel cell system 6 can be maintained at a high level.

In addition, the closed water circuit is formed by the thermo-work actuator 17 that is a mechanical actuator without using the force due to the electrical power, and the three-way valve 170 operated by the thermo-work actuator 171. Therefore, the cooling water circuit 30 can be provided in low cost.

Figure 11:
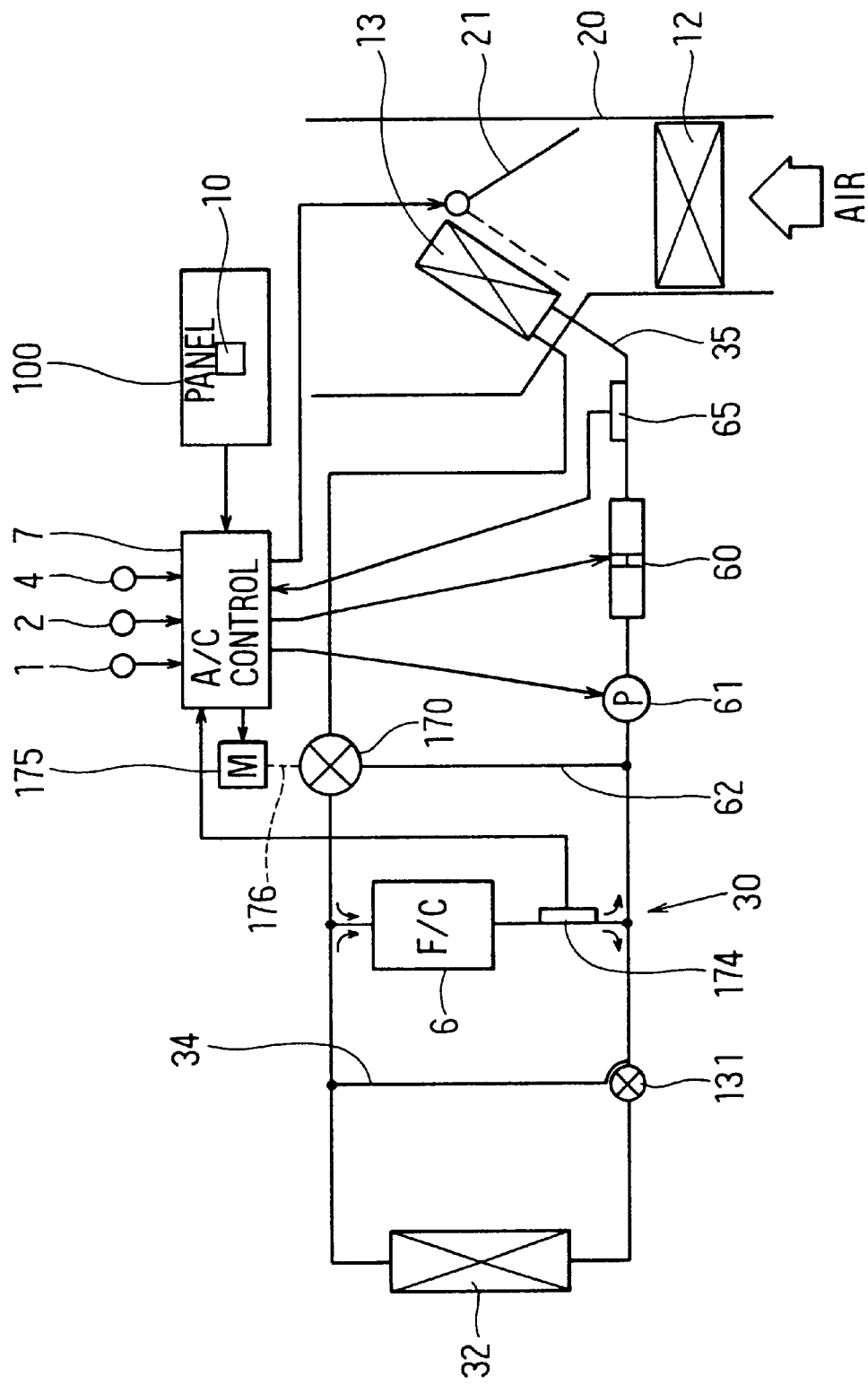
FIG. 11 is a schematic diagram showing a vehicle air conditioner with a cooling water circuit, according to a fifth preferred embodiment of the present invention.

A fifth preferred embodiment of the present invention will be now described with reference to FIG. 11. In the above-described fourth embodiment, the three-way valve 170 is operated by the thermo-work actuator 171 that is a mechanical actuator. However, in the fifth embodiment, the three-way valve 170 is operated by a servomotor 75 that is an electrical actuator. In the fifth embodiment, components similar to those of the above-described fourth embodiment are indicated with the same reference numbers, and the explanation thereof is omitted. As shown in FIG. 11, a temperature sensor 174 for detecting temperature of cooling water flowing from the fuel cell system 6 is disposed at an upstream side of a branch point between the first cooling water passage 34 and the second cooling water passage 35 in the cooling water circuit 30. A signal from the temperature sensor 174 is output to the A/C control unit 7. The A/C control unit 7 outputs a control signal to the servomotor 175 based on the signal from the temperature sensor 174. The servomotor 175 is an electrical actuator disposed in the passenger compartment, and is connected to the three-way valve 170 through the link mechanism 176. Accordingly, when the servomotor 175 operates, the three-way valve 170 operates. In the fifth embodiment, the three-way valve 170, the temperature sensor 174, the servomotor 175 and the link mechanism 176 construct water passage switching means.

Next, operation according to the fifth embodiment will be now described. When the temperature of cooling water detected by the temperature sensor 174 is equal to or higher than 76° C., the servomotor 175 operates the three-way valve 170 based on the signal from the A/C control unit 7 so that cooling water from the heater core 13 flows into the fuel cell system 6. On the other hand, when the temperature of cooling water detected by the temperature sensor 174 is lower than 76° C., the servomotor 175 operates the three-way valve 170 based on the signal from the A/C control unit 7 so that cooling water from the heater core 13 flows into the passage 62 forming the closed water passage.

Accordingly, when the temperature of the cooling water from the fuel cell system 6 is equal to or higher than 76° C., cooling water from the fuel cell system 6 flows into both the first cooling water passage 34 and the second cooling water passage 35. On the other hand, when the temperature of the cooling water from the fuel cell system 6 is lower than 76° C., because cooling water circulates in the closed water circuit formed by the second cooling water passage 35 and the passage 62, cooling water does not circulates in the first cooling water passage 34.

In the fifth embodiment, when the temperature of cooling water from the fuel cell system 6, detected by the temperature sensor 174, is equal to or higher than 76° C., and when the temperature of cooling water flowing into the heater core 13, detected by the temperature sensor 65, is lower than the target temperature TWO, the A/C control unit 7 controls electrical power supplied to the electrical heater 60 so that the temperature of cooling water flowing into the heater core 13 becomes the target temperature TWO. That is, the electrical power supplied to the electrical heater 60 is controlled so that the necessary air-conditioning heating capacity can be obtained.

When the temperature of cooling water flowing from the fuel cell system 6, detected by the temperature sensor 174, is smaller than 76° C., it is determined that there is not a surplus heat discharged from the fuel cell system 6 for heating air. Thus, in this case, the A/C control unit 7 operates the water pump 61 so that cooling water in the second cooling water passage 35 circulates in the closed water circuit by the switching operation of the three-way valve 170. In this case, cooling water flows through the water pump 61, the electrical heater 60, the heater core 13, the passage 62 in this order, so that the necessary heat quantity necessary in the heating operation can be supplied to the heater core 13. At this time, the A/C control unit 7 controls operation of the electrical heater 60 based on a signal from the temperature sensor 65.

According to the fifth embodiment, even when the heat quantity discharged from the fuel cell system 6 is insufficient for obtaining the necessary heating capacity, the predetermined stable heating capacity can be effectively obtained. Further, when the heat quantity radiated from the fuel cell system 6 is zero, the necessary air-conditioning heating capacity can be supplied to the heater core 13 in the closed second cooling water passage 35. Accordingly, even when the surplus heat from the fuel cell system 6 is not generated, a stable heating capacity can be rapidly obtained using heat from the electrical heater 60.

A sixth preferred embodiment of the present invention will be now described with reference to FIG. 12. In the above-described fourth embodiment, the insufficient heat quantity is supplemented using the electrical heater 60 disposed in the second cooling water passage 35 at the upstream side of the heater core 13 in the water flow direction. However, in the sixth embodiment, similarly to the above-described first embodiment, the insufficient heat quantity is supplemented using heat from the electrical heater 14 disposed at the downstream side of the heater core 13. In the sixth embodiment, the components similar to those of the above-described first and fourth embodiments are indicated with the same reference numbers, and the explanation thereof is omitted.

Figure 12:
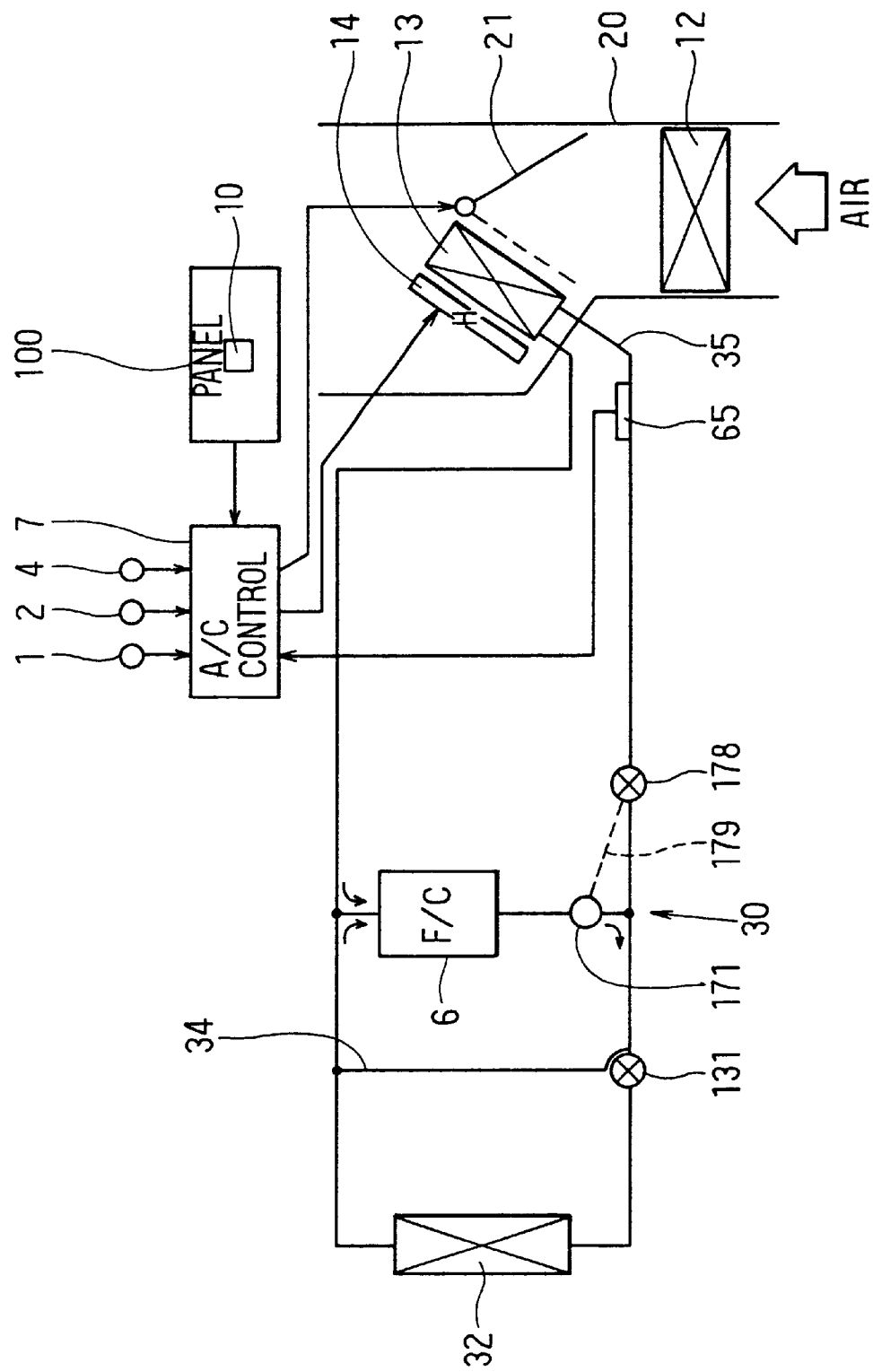
FIG. 12 is a schematic diagram showing a vehicle air conditioner with a cooling water circuit, according to a sixth preferred embodiment of the present invention.

As shown in FIG. 12, similarly to the above-described first embodiment, the electrical heater 14 (e.g., PCT heater) as a supplemental heater is disposed in the air duct 20 at a downstream air side of the heater core 13. Accordingly, in the sixth embodiment, the electrical heater 60, the water pump 61, the passage 62 and the three-way valve 170 described in the above-described fourth embodiment are not provided.

In the sixth embodiment, an opening/closing valve 178 for opening and closing the second cooling water passage 35 is disposed in the second cooling water passage 35 at a downstream side (the side of the heater core 13) from the branch point between the first cooling water passage 34 and the second cooling water passage 35. Further, similarly to the above-described fourth embodiment, the thermo-work actuator 171 which is driven when the temperature of cooling water from the fuel cell system 6 is higher than a predetermined temperature 76° C.) is disposed at the upstream side of the branch point between the first cooling water passage 34 and the second cooling water passage 35.

The opening/closing valve 178 and the thermo-work actuator 171 are connected by a link mechanism 179 so that the opening/closing valve 178 is operated by the driving force of the thermo-work actuator 171. That is, when the temperature of cooling water from the fuel cell system 6 is equal to or higher than 76° C., the second cooling water passage 35 is opened. On the other hand, when the temperature of cooling water from the fuel cell system is lower than 76° C., the second cooling water passage 35 is closed.

Next, operation according to the sixth embodiment will be now described. When the temperature of cooling water from the fuel cell system 6 is equal to or higher than 76° C., the opening/closing valve 178 opens the second cooling water passage 35 so that cooling water from the fuel cell system 6 flows into both the first cooling water passage 34 and the second cooling water passage 35. On the other hand, when the temperature of cooling water from the fuel cell system is lower than 76° C., the opening/closing valve 178 closes the second cooling water passage 35 so that cooling water from the fuel cell system 6 only flows into the first cooling water passage 34 and does not flow into the second cooling water passage 35.

According to the sixth embodiment, when the temperature of cooling water from the fuel cell system 6 is equal to or higher than 76° C., and when the temperature of cooling water flowing into the heater core 13, detected by the temperature sensor 65, is lower than the target temperature TWO, the A/C control unit 7 controls electrical power supplied to the electrical heater 14 so that the necessary air-conditioning heating capacity can be obtained.

When the temperature of cooling water flowing from the fuel cell system 6 is smaller than 76° C., it is determined that there is not a surplus heat discharged from the fuel cell system 6 for heating air. Thus, in this case, the A/C control unit 7 controls the electrical power supplied to the electrical heater 14, so that the air temperature blown into the passenger compartment becomes the target air temperature TAO.

According to the sixth embodiment, even when the heat quantity discharged from the fuel cell system 6 is insufficient for obtaining the necessary air-conditioning heating capacity, the predetermined stable heating capacity can be effectively obtained. Further, when the heat quantity radiated from the fuel cell system 6 is zero, the flow of cooling water flowing into the heater core 13 is interrupted so that the heat of cooling water does not radiate from the heater core 13. On the other hand, when the surplus heat quantity is discharged from the fuel cell system 6, cooling water from the fuel cell system 6 is supplied to the heater core 13.

Although the present invention has been fully described in connection with the preferred embodiments thereof with reference to the accompanying drawings, it is to be noted that various changes and modifications will become apparent to those skilled in the art.

In the above-described embodiments, the air temperature blown into the passenger compartment is controlled using an air-mixing method; however, may be controlled using a re-heating method.

In the above-described first through third embodiments, the three-way valve 31 is disposed at the upstream branch point between the cooling water passage of the radiator 32 and the first cooling water passage 34. However, any a valve for adjusting the flow amount of cooling water in each cooling water passage may be provided.

In the above-described first, second and third embodiments, the surplus heat quantity Q1 possible to be discharged from the fuel cell system 6 is estimated based on the operation state of the fuel cell system 6 and the detection value of the water temperature sensor 36. However, a water temperature sensor may be also disposed at a cooling water outlet side of the fuel cell system 6 so that the surplus heat quantity Q1 may be estimated based on a temperature difference between cooling water at the outlet side of the fuel cell system 6 and cooling water at the inlet side of the fuel cell system 6.

In the above-described second embodiment, in the control calve 40, the position of the valve member 45 is duty-controlled so that a ratio between the time period for which cooling water passes through the first passage 50 and the time period for which cooling water passes through the second passage 52 is changed to adjust the flow amount ratio. However, the second embodiment, the control valve described in the third embodiment may be used.

In the above-described second, fourth and fifth embodiments, the electrical heater 60 for heating cooling water flowing into the heater core 13 is used. However, instead of the electrical heater 60, the other heater such as a combustion heater can be used.

The water pump 61 is disposed at the downstream side of the electrical heater 60 in second the cooling water passage 35 in the above-described second embodiment, and is disposed at the upstream side of the electrical heater 60 in second the cooling water passage 35 in the above-described fourth and fifth embodiments. However, the water pump 61 can be disposed at the other position in the second cooling water passage 35 constructing the closed water circuit.

In the above-described fourth embodiment, the A/C control unit 7 controls the water pump 61 to be operated when the A/C switch is turned on. However, the water pump 61 may be operated only when the three-way valve 70 is operated to form the closed water circuit.

Figure 13:
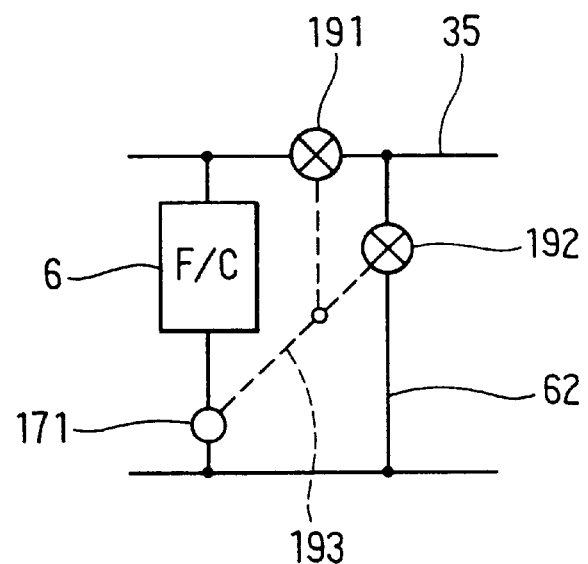
FIG. 13 is a schematic diagram showing a main part of a cooling water circuit in a vehicle air conditioner, according to a modification of the present invention.
Figure 14:
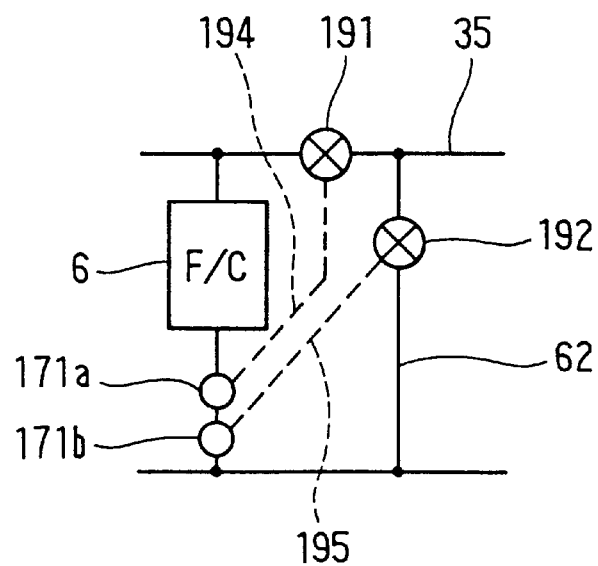
FIG. 14 is a schematic diagram showing a main part of a cooling water circuit in a vehicle air conditioner, according to an another modification of the present invention.

In the above-described fourth embodiment, the three-way valve 170 is disposed at the connection point between the second cooling water passage 35 and the passage 62 for the closed water circuit. However, as shown in FIGS. 13 and 14, instead of the three-way valve 170, opening/closing valves 191, 192 may be disposed. In this case, when the surplus heat quantity Q1 is discharged from the fuel cell system 6, the opening/closing valve 191 is opened and the opening/closing valve 192 is closed. On the other hand, when the temperature of cooling water from the fuel cell system 6 is lower than a predetermined temperature so that there is not the surplus heat quantity to be used for the air-conditioning operation, the opening/closing valve 191 is closed and the opening/closing valve 192 is opened. Further, the opening/closing valves 191, 192 can be operatively linked with the thermo-work actuator 171 through a link mechanism 193, as shown in FIG. 13. Alternatively, as shown in FIG. 14, the opening/closing valve 191 can be linked to the thermo-work actuator 171a through a link mechanism 194, and the opening/closing valve 192 can be linked to the thermo-work actuator 171b through a link mechanism 195. Similarly, in the above-described fifth embodiment, the opening/closing valves 191, 192 can be used instead of the three-way valve 170.

In the above-described sixth embodiment, the three-way valve 170 described in the fifth embodiment can be used instead of the opening/closing valve 178.

Such changes and modifications are to be understood as being within the scope of the present invention as defined by the appended claims.

What is claimed is:

1. An air conditioner for a vehicle having a passenger compartment and an equipment that needs a temperature control, the air conditioner comprising:

a cooling water circuit in which cooling water for cooling the equipment circulates;

a heating heat exchanger, disposed in the cooling water circuit, for heating air to be blown into the passenger compartment using cooling water as a heating source;

a supplementary heater for heating air, which supplements a heat quantity relative to the heating heat exchanger;

heat quantity calculating means for calculating a necessary heat quantity necessary for a heating of air blown into the passenger compartment, based on a target air temperature;

a flow control unit which controls a flow of cooling water in the cooling water circuit in such a manner that: cooling water from the equipment flows into the heating heat exchanger after temperature of the equipment increases to a predetermined temperature, and the flow of cooling water from the equipment to the heating heat exchanger is interrupted until the temperature of the equipment increases to the predetermined temperature; and heater control means for controlling a heat quantity generated by the supplementary heater when a heat quantity for heating air in the heating heat exchanger is smaller than the necessary heat quantity calculated by the heat quantity calculating means after the temperature of the equipment increases to the predetermined temperature;

wherein the equipment is a fuel cell system.

2. The air conditioner according to claim 1, further comprising surplus heat calculating means for calculating a surplus heat quantity of the equipment after the temperature of the equipment increases to the predetermined temperature, based on an operation state of the equipment and the temperature of cooling water, wherein the flow control unit operates so that all the surplus heat quantity of the equipment is supplied to the heating heat exchanger when the necessary heat quantity is larger than the surplus heat quantity.

3. An air conditioner for a vehicle having a passenger compartment and an equipment that needs a temperature control, the air conditioner comprising:

a cooling water circuit in which cooling water for cooling the equipment circulates;

a heating heat exchanger, disposed in the cooling water circuit, for heating air to be blown into the passenger compartment using cooling water as a heating source;

a supplementary heater for heating air, which supplements a heat quantity relative to the heating heat exchanger;

heat quantity calculating means for calculating a necessary heat quantity necessary for a heating of air blown into the passenger compartment, based on a target air temperature;

a flow control unit which controls a flow of cooling water in the cooling water circuit in such a manner that: cooling water from the equipment flows into the heating heat exchanger after temperature of the equipment increases to a predetermined temperature, and the flow of cooling water from the equipment to the heating heat exchanger is interrupted until the temperature of the equipment increases to the predetermined temperature; and heater control means for controlling a heat quantity generated by the supplementary heater when a heat quantity for heating air in the heating heat exchanger is smaller than the necessary heat quantity calculated by the heat quantity calculating means after the temperature of the equipment increases to the predetermined temperature;

surplus heat calculating means for calculating a surplus heat quantity of the equipment after the temperature of the equipment increases to the predetermined temperature, based on an operation state of the equipment and the temperature of cooling water; and a radiator disposed in the cooling water circuit, for radiating heat of cooling water in the cooling water circuit to an outside of the passenger compartment; wherein:

the flow control unit operates so that all the surplus heat quantity of the equipment is supplied to the heating heat exchanger when the necessary heat quantity is larger than the surplus heat quantity; and the flow control unit operates so that, when the surplus heat quantity of the equipment is larger than the necessary heat quantity, a part of the surplus heat quantity, equal to the necessary heat quantity, is supplied from the equipment to the heating heat exchanger, and the other part of the surplus heat quantity is supplied from the equipment to the radiator.

4. An air conditioner for a vehicle having a passenger compartment and an equipment that needs a temperature control, the air conditioner comprising:

a cooling water circuit in which cooling water for cooling the equipment circulates;

a heating heat exchanger, disposed in the cooling water circuit, for heating air to be blown into the passenger compartment using cooling water as a heating source;

a supplementary heater for heating air, which supplements a heat quantity relative to the heating heat exchanger;

heat quantity calculating means for calculating a necessary heat quantity necessary for a heating of air blown into the passenger compartment, based on a target air temperature;

a flow control unit which controls a flow of cooling water in the cooling water circuit in such a manner that: cooling water from the equipment flows into the heating heat exchanger after temperature of the equipment increases to a predetermined temperature, and the flow of cooling water from the equipment to the heating heat exchanger is interrupted until the temperature of the equipment increases to the predetermined temperature; and heater control means for controlling a heat quantity generated by the supplementary heater when a heat quantity for heating air in the heating heat exchanger is smaller than the necessary heat quantity calculated by the heat quantity calculating means after the temperature of the equipment increases to the predetermined temperature; wherein:

the cooling water circuit has a bypass passage through which cooling water from the equipment flows into the equipment while bypassing the heating heat exchanger;

the flow control unit is disposed to control a ratio between a flow amount of cooling water passing through the heating heat exchanger and a flow amount of cooling water passing through the bypass passage, in accordance with a heat quantity of cooling water for heating air in the heating heat exchanger in a range of the necessary heat quantity.

5. The air conditioner according to claim 4, wherein the supplementary heater is disposed to directly heat air to be blown into the passenger compartment.

6. The air conditioner according to claim 4, wherein the supplementary heater is disposed in the cooling water circuit to heat cooling water flowing into the heating heat exchanger.

7. The air conditioner according to claim 6, further comprising:
   closed circuit forming means for forming a closed water circuit through which cooling water circuits while bypassing the equipment in the cooling water circuit; and
   a water pump for circulating cooling water within the closed water circuit, wherein:
      the heating heat exchanger and the supplementary heater are disposed in the closed water circuit; and
      when the temperature of the equipment is lower than the predetermined temperature, the closed circuit forming means defines the closed water circuit, and the water pump operates so that cooling water circulates in the closed water circuit.

8. The air conditioner according to claim 4, wherein the flow control unit is disposed to control a ratio between a time period for which cooling water passes through the bypass passage and a time period for which cooling water passes through the heating heat exchanger.

9. The air conditioner according to claim 4, wherein:
   the flow control unit has therein a first passage for forming the bypass passage and a second passage through which cooling water from the cooling heat exchanger flows toward the equipment; and
   the flow control unit is disposed to control a ratio between an area of the first passage and an area of the second passage.

10. An air conditioner for a vehicle having a passenger compartment and an equipment that needs a temperature control, the air conditioner comprising:
   a cooling water circuit in which cooling water for cooling the equipment circulates;
   a heating heat exchanger, disposed in the cooling water circuit, for heating air to be blown into the passenger compartment using cooling water as a heating source;
   a supplementary heater for heating air, which supplements a heat quantity relative to the heating heat exchanger;
   heat quantity calculating means for calculating a necessary heat quantity necessary for a heating of air blown into the passenger compartment, based on a target air temperature;
   a flow control unit which controls a flow of cooling water in the cooling water circuit in such a manner that:
      cooling water from the equipment flows into the heating heat exchanger after temperature of the equipment increases to a predetermined temperature, and the flow of cooling water from the equipment to the heating heat exchanger is interrupted until the temperature of the equipment increases to the predetermined temperature; and
   heater control means for controlling a heat quantity generated by the supplementary heater when a heat quantity for heating air in the heating heat exchanger is smaller than the necessary heat quantity calculated by the heat quantity calculating means after the temperature of the equipment increases to the predetermined temperature; wherein:
      the supplementary heater is disposed in the cooling water circuit to heat cooling water flowing into the heating heat exchanger;
      the flow control unit is flow switching means for forming a closed water circuit through which cooling water circuits while bypassing the equipment in the cooling water circuit; and
      the closed water circuit has therein a water pump for circulating cooling water within the closed water circuit;
      the heating heat exchanger and the supplementary heater are disposed in the closed water circuit; and
      when the temperature of the equipment is lower than the predetermined temperature, the flow switching means forms the closed water circuit, and the water pump operates so that cooling water circulates in the closed water circuit.

11. The air conditioner according to claim 10, wherein the flow switching means includes a mechanical actuator driven in accordance with temperature of cooling water, and a valve operated by the driving force of the mechanical actuator.

12. The air conditioner according to claim 11, wherein the mechanical actuator is a thermo-work actuator which drives the valve under a temperature by a melting or a solidifying of a wax.

13. The air conditioner according to claim 10, wherein the flow switching means includes an electrical actuator disposed in the passenger compartment and driven in accordance with temperature of cooling water, and a valve operated by the driving force of the electrical actuator.

14. The air conditioner according to claim 1, wherein:
   the supplementary heater is disposed to heat air blown into the passenger compartment; and
   the flow control unit is flow interrupting means which interrupts a flow of cooling water into the heating heat exchanger when the temperature of the equipment is lower than the predetermined temperature.

15. The air conditioner according to claim 14, wherein the flow interrupting means includes a mechanical actuator driven in accordance with temperature of cooling water, and a valve operated by the driving force of the mechanical actuator.

16. The air conditioner according to claim 14, wherein the flow interrupting means includes an electrical actuator disposed in the passenger compartment and driven in accordance with temperature of cooling water, and a valve operated by the driving force of the electrical actuator.

17. The air conditioner according to claim 15, wherein the mechanical actuator is a thermo-work actuator which drives the valve under a temperature by a melting or a solidifying of a wax.

* * * * *